Dec. 18, 1956  W. J. GERBER  2,774,254
AUTOMATIC CONSTANT SPEED DEVICE
Filed Jan. 21, 1955  4 Sheets-Sheet 1

INVENTOR
WALTER J. GERBER
BY
George J. Kubene
ATTORNEYS

INVENTOR
WALTER J. GERBER

Dec. 18, 1956     W. J. GERBER     2,774,254
AUTOMATIC CONSTANT SPEED DEVICE

Filed Jan. 21, 1955     4 Sheets-Sheet 3

INVENTOR
WALTER J. GERBER
BY
ATTORNEYS

Dec. 18, 1956  W. J. GERBER  2,774,254
AUTOMATIC CONSTANT SPEED DEVICE
Filed Jan. 21, 1955  4 Sheets-Sheet 4
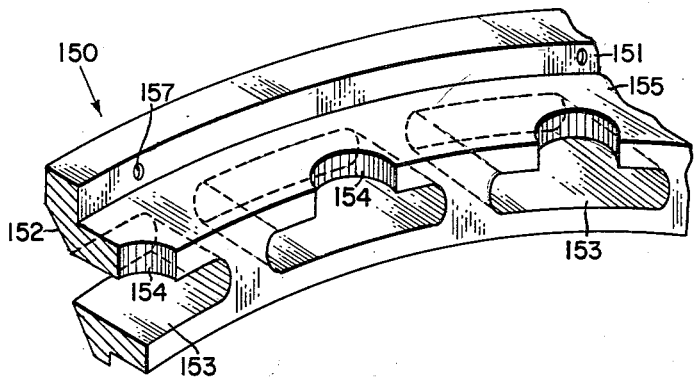
Fig. 7
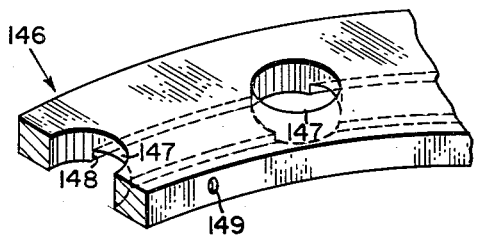
Fig. 6
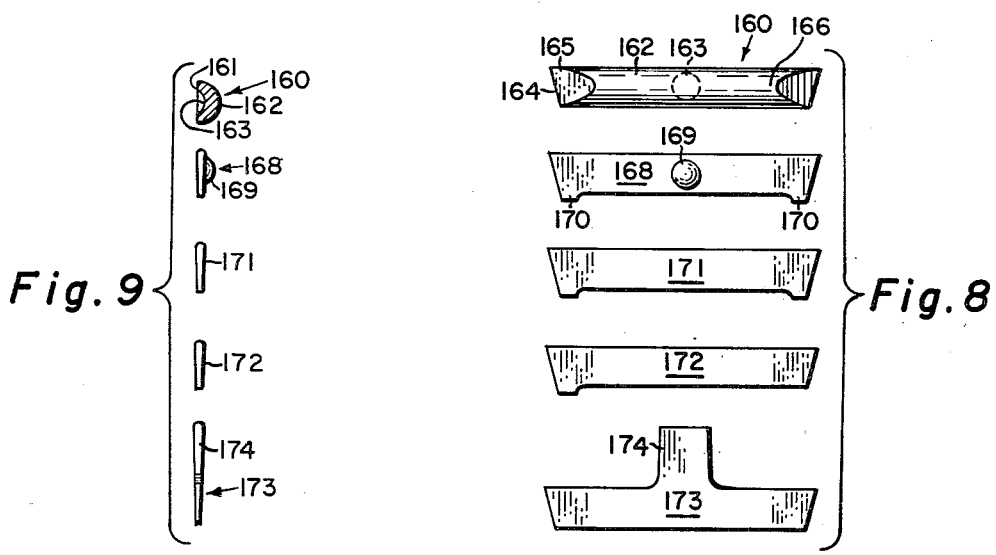
Fig. 9
Fig. 8
INVENTOR
WALTER J. GERBER
BY
ATTORNEYS United States Patent Office 2,774,254
Patented Dec. 18, 1956

2,774,254
AUTOMATIC CONSTANT SPEED DEVICE

Walter J. Gerber, San Diego, Calif.

Application January 21, 1955, Serial No. 483,450

17 Claims. (Cl. 74—675)

(Granted under Title 35, U. S. Code (1952), sec. 266)

The invention described herein may be manufactured and used by or for the Government of the United States of America for governmental purposes without the payment of any royalties thereon or therefor.

The present invention relates to an automatic constant speed device and more particularly to such a device employing a variable ratio transmission which controls a power transmitting differential means, the gear ratio of the transmission being automatically altered in accordance with the differences in the speeds of a reference means and the output means of the device.

The present invention may be utilized in any application where it is desired to obtain a constant output speed from a variable speed prime mover such as an internal combustion engine or turbine and the like. However, the invention device is primarily intended for use in aircraft wherein the electric generators are driven by the gas engines of the aircraft. In modern day aircraft, a great deal of electronic equipment is utilized such as radar and the like requiring a constant non-varying source of electricity which in present day applications is usually at 110 volt, 3 phase, 400 cycle alternating current. The successful operation of such electronic equipment is dependent upon such a constant source of electrical power. In order to obtain such a source of electrical power, it is necessary either to drive a D. C. generator and employ an inverter means to change the D. C. to A. C., or to drive an A. C. generator at a constant speed.

The use of D. C. motors and the accompanying inverter means is widely used in present day aircraft. This arrangement produces the required electrical energy but is unsatisfactory due to the inherent bulk and weight of such equipment and furthermore because of the expense involved in the maintenance of D. C. equipment. The obvious solution is to employ a means for driving an A. C. generator at a constant speed and various attempts have been made to design devices which will produce a constant speed output from the variable speed of the prime mover of the aircraft. Such prior art devices have proven unsatisfactory due to the small range of speed changes obtainable therewith and the fine degree of machining required in the construction thereof. Such prior art devices have also proven to be costly and have displayed low efficiency in operation.

The present invention is a mechanical device for producing a constant output speed over a wide range of varying input speeds. The invention device employs a power differential means which transmits power from a prime mover to an A. C. generator or the like. This power differential is controlled by a variable ratio transmission. A means is provided which produces a reference speed in accordance with the desired output speed, and this reference speed is compared with the actual output speed of the device. If there is a difference in the reference speed and the output speed, the gear ratio of the variable ratio transmission is automatically altered thereby controlling the power transmission such that the actual output speed of the device is caused to coincide with the reference speed. In this manner the actual output speed of the device is maintained substantially constant over a wide range of varying input speeds.

An object of the present invention is the provision of a new and novel automatic constant speed device which gives a substantially constant output speed over a wide range of varying input speeds.

Another object is to provide an automatic constant speed device which eliminates the necessity of providing heavy D. C. equipment and accompanying inverter devices.

A further object of the invention is the provision of an automatic constant speed device which is comparatively light, compact and inexpensive in construction, yet rugged and efficient in operation.

Other objects and many of the attendant advantages of this invention will be readily appreciated as the same becomes better understood by reference to the following detailed description when considered in connection with the accompanying drawings wherein:

Fig. 6 is a partial isometric view of the ring member of the variable tooth gear;

Fig. 7 is a partial isometric view of one of the tooth support members of the variable tooth gear;

Fig. 8 is an elevation of the various representative gear tooth slats of the variable tooth gear, and Fig. 9 is an end view of the slats shown in Fig. 8.

Figure 1:
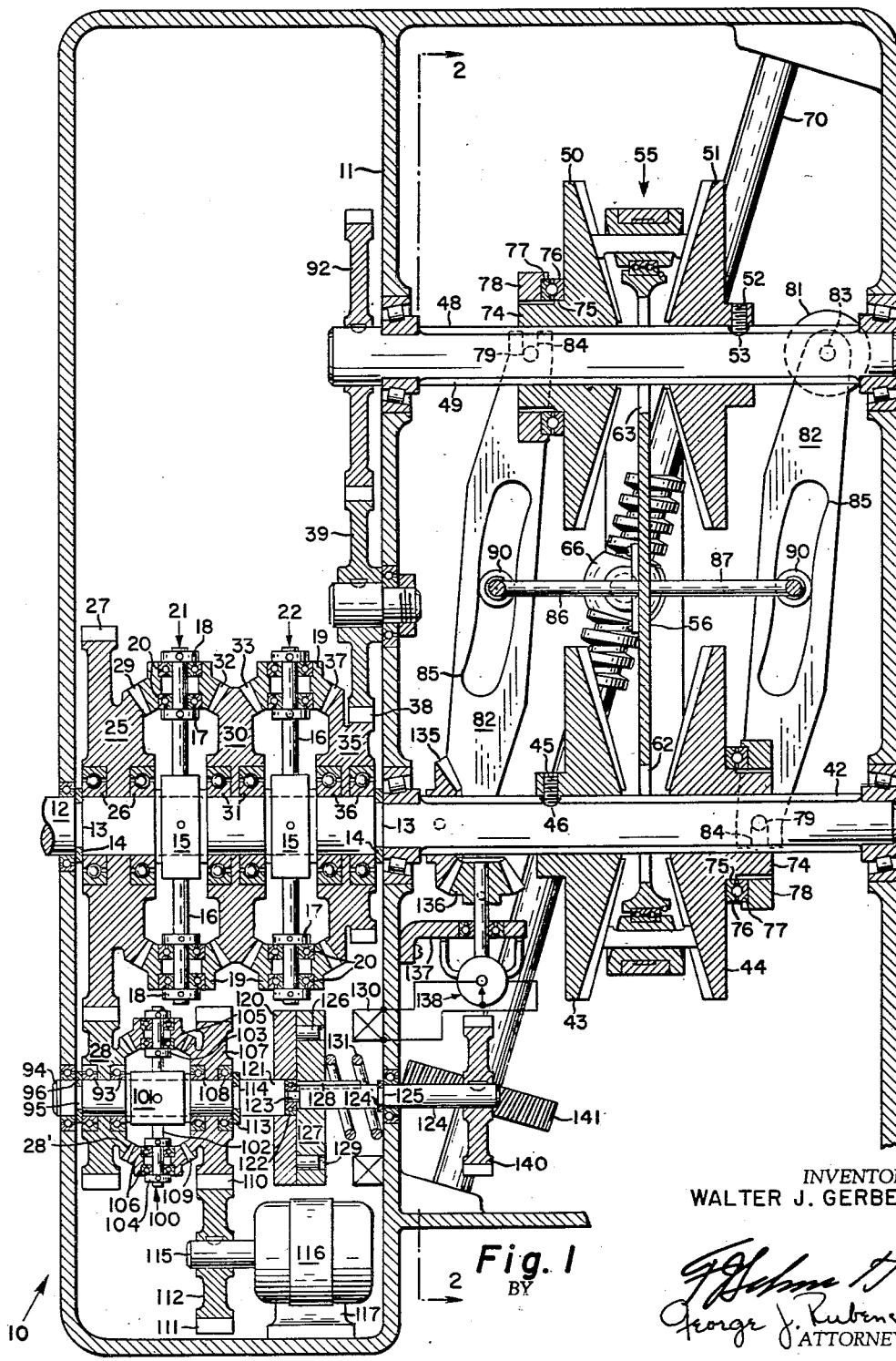
Fig. 1 is a longitudinal section of the device with certain parts removed for clarity.

Referring now to the drawings wherein like reference characters designate like or corresponding parts throughout the several views, there is shown in Fig. 1 a hollow housing 10 having a dividing wall 11 formed integral therewith which divides the housing into two separate chambers. An input shaft 12 is journaled by means of suitable bearings in the walls of the housing and has two spaced grooves 13 formed therein within which are disposed snap rings 14 which prevent the shaft from being displaced axailly relative to the housing.

Two similar ring members 15 are pinned to the shaft such that they rotate therewith and each have diametrically oppositely extending pinion shafts 16 fixed thereto. Each pinion shaft has an inner collar 17 and an outer collar 18 secured thereto in spaced relationship, a pinion gear 19 being freely mounted therebetween on ball bearings 20 such that the pinion gears are freely rotatable with respect to the pinion shafts. Each of the ring members 15 and the associated gear assembly supported thereby as just described may be referred to as a spider gear means, the left-hand spider gear means being indicated generally by reference numeral 21 and the right-hand spider gear means being indicated generally by reference numeral 22.

An output gear 25 rotatably journaled by means of bearings 26 on shaft 12 is provided with output teeth 27 which may be in engagement with the driving means of an A. C. generator (not shown) or any other device which it is desired to drive. Output teeth 27 are also in engagement with the teeth of a gear 28 which forms a portion of a governor differential means which will be hereinafter more fully described. Gear 25 is also provided wtih a set of teeth 29 on the lateral portion thereof which are in engagement with the pinion gears of spider gear means 21. An intermediate gear 30 rotatably journaled by means of bearings 31 on shaft 12 has two sets of lateral teeth 32 and 33 formed thereon which are respectively in engagement with the pinion gears of spider gear means 21 and 22. A control gear 35 rotatably journaled on shaft 12 by means of bearings 36 has lateral teeth 37 formed thereon which are in engagement with the pinion gears of spider means 22 and also has a set of teeth 38 which are in engagement with the teeth of gear 39, the purpose of which will hereinafter be more fully described.

Shaft 12 is provided with splines 42 and two similar cone members 43, 44 have openings extending longitudinally therethrough provided with keyways which receive the splines such that the cone members are rotatably fixed to shaft 12. Member 43 is fixed to shaft 12 by means of a screw 45 the rounded end of which seats in a cooperating recess 46 formed in the shaft, and member 44 is freely slidable axailly along the shaft.

A second shaft 48 is rotatably journaled by means of suitable bearings within housing 10 and is provided with splines 49. Two cone members 50 and 51 which respectively correspond to cone members 44 and 43 are splined to the shaft, member 51 being fixed to the shaft by means of a screw 52 which seats within recess 53 formed in the shaft and member 50 being freely slidable axially along the shaft.

The teeth of each of the cone members are of a radial groove construction being cut at a slightly increasing depth and of increasing width toward the periphery of the member. The sides of the teeth are finished at an angle, thereby providing the load carrying surface. When assembled on the splined shaft, the first pair of cones 43 and 44 and the second pair of cones 50 and 51 are staggered with relation to each other such that the teeth of members 43 and 50 are opposite the grooves in members 44 and 51 respectively.

The first pair of cones are drivingly connected to the second pair of cones by a novel variable tooth gear indicated generally by reference numeral 55 which will be hereinafter more fully described. Gear 55 is rotatably mounted upon a support member 56 by means of a circular ball bearing 57 which has the outer race thereof clamped between flanges formed on the inner periphery of the variable tooth gear and the inner race thereof clamped between a flange 58 formed on member 56 and a snap ring 59 mounted within a circumferential groove 60 formed in the outer periphery of member 56.

Figure 2:
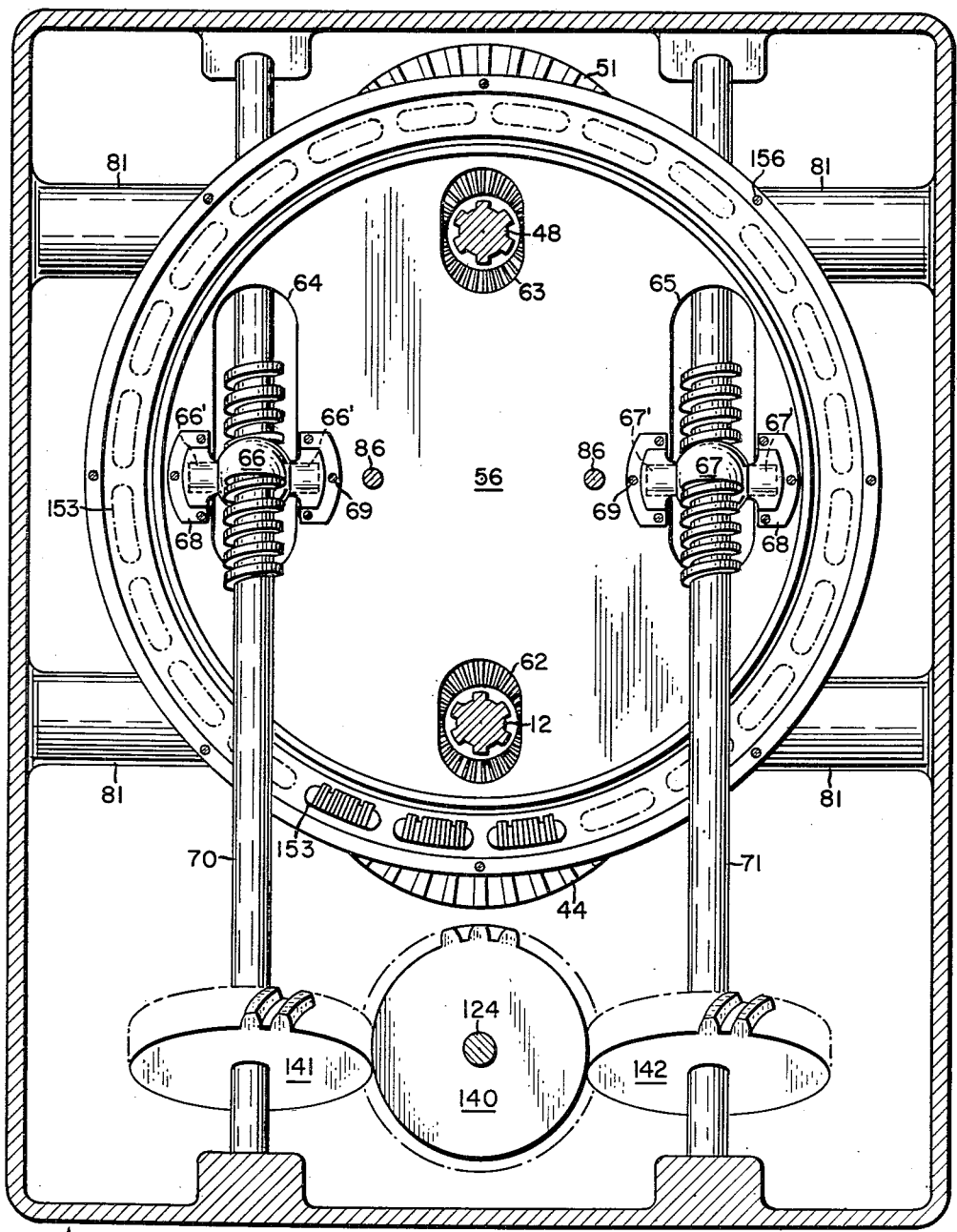
Fig. 2 is a cross-sectional view taken on line 2—2 of Fig. 1 with certain parts removed.
Figure 3:
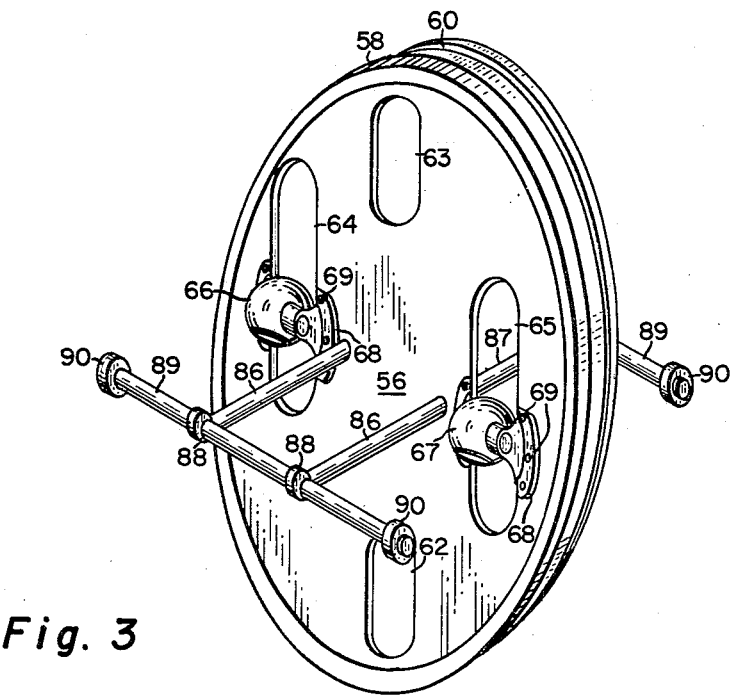
Fig. 3 is an isometric view of the support member of the device and some of the components supported thereby.

As may be most clearly seen in Fig. 3, support member 56 is a generally disk-shaped member having an enlarged outer periphery for supporting ball bearing 57. Two elliptical openings 62 and 63 are formed through member 56 and shafts 12 and 48 pass freely therethrough whereby the support member may move up and down with respect to the shafts without interfering with the rotation thereof. Two other elliptical openings 64 and 65 are spaced 90 degrees from openings 62 and 63 and have fittings 66 and 67 disposed thereover respectively. Referring to Fig. 2, it may be seen that each of fittings 66 and 67 comprises a central spherical portion having a threaded opening therethrough and two oppositely extending studs 66', 67' respectively extending from diametrically opposite portions thereof. Studs 66', 67' are rotatably mounted in brackets 68 which are secured to member 56 by means of screws 69. It is apparent that fittings 66 and 67 may freely pivot with respect to member 56, but vertical movement of the fittings will cause a corresponding movement of the support member.

A pair of jack shaft members 70 and 71 have threads formed thereon which are in threaded engagement with fittings 66 and 67, the opposite ends of the jack shafts being journaled in suitable bearings mounted in housing 10. Upon rotation of the jack shafts, member 56 which is constrained by the jack shafts from rotating will move laterally and transversely with respect to shafts 12 and 48 due to the cooperation between the threads on the jack shafts and the fittings 66, 67 thereby causing the variable tooth gear 55 to alter its position with respect to the cone members and change the gear ratio of the variable ratio transmission means which includes the two pairs of cones and the variable tooth gear.

Identical longitudinally extending cylindrical fittings 74 are formed integral with cones 44 and 50 and each has a stepped shoulder 75 upon which is placed a first race 76 of a thrust bearing, the second race 77 of which is spaced from the outer surface of fitting 74. Race 77 is suitably secured to a thrust collar 78 which is also spaced from the outer surface of flange 74. Each of collars 78 has two diametrically opposite studs 79 extending therefrom.

Four similar lever members 82, only two of which may be seen in Fig. 1, are pivotally mounted at one end 83 to a boss 81 within the housing, the left-hand pair as viewed in Fig. 1 being pivotally mounted at the lower end thereof and the right-hand pair being pivotally mounted at the upper end thereof. The opposite ends of the lever members are formed as a fork portion having channels 84 formed therein for slidably receiving studs 79. Each pivoted pair of levers engage the studs secured to one of the thrust collars such that pivotal movement of the levers will urge the slidable cone members 44 and 50 axially along their respective shafts, and each of lever members 82 has a curved cam slot 85 formed therethrough.

Referring to Figs. 1 and 3, support member 56 has a first pair of support arms 86 secured thereto and extending normally from one surface thereof and a second pair of similar support arms 87 secured thereto and extending normally from the opposite surface thereof. Each of the support arms has a bearing 88 mounted in the outer end thereof in which is journaled a shaft 89. The opposite ends of each shaft 89 have roller members 90 mounted thereon such that the roller members are freely rotatable on the shafts and constrained from axial movement relative thereto by suitable shoulders on the shafts. Each of the roller members 90 is positioned within one of the cam grooves 85 of lever members 82. It is therefore apparent that as support member 56 is displaced laterally due to movements of the jack shafts, support arms 86 and 87 will move therewith displacing the rollers within cam slots 85 thereby pivoting levers 82 and altering the position of cone members 44 and 50 such that each pair of cones is maintained in proper spaced relationship in accordance with the position of variable tooth gear 55 with respect to the cone members.

A gear 92 is fixed to the outer end of shaft 48 and engages gear 39 fixed to a short idler shaft which is suitably journaled in dividing wall 11. Through this connection, the variable ratio transmission controls the speed of rotation of gear 35 and may consequently control the operation of the power differential unit.

Gear 28 which is in engagement with output gear 25 is rotatably journaled by means of bearings 93 upon an auxiliary shaft 94 which is journaled by means of suitable bearings in the walls of the housing and has a groove 95 formed therein within which is disposed a snap ring 96 which prevents the shaft from being displaced axially to the left relative to the housing.

A spider gear means 100 comprises a ring 101 which is pinned to shaft 94 such that it rotates therewith and has diametrically oppositely extending pinion shafts 102 fixed thereto. Each shaft 102 has an inner collar 103 and an outer collar 104 secured thereto in spaced relationship, a pinion gear 105 being freely mounted therebetween on ball bearings 106 such that the pinion gears are freely rotatable with respect to the pinion shafts. Gear 28 is provided with a set of teeth 28' on the lateral portion thereof which are in engagement with the pinion gears of spider gear means 100.

A reference speed gear 107 rotatably journaled by means of bearings 108 on shaft 94 is provided with a set of teeth 109 on the lateral portion thereof which are in engagement with pinion gears 105 and is also provided with a set of teeth 110 which are in engagement with the teeth of a gear 112. The governor differential assembly including gears 28, 107 and spider gear means 100 is held in place on shaft 94 between snap ring 96 and snap ring 113 mounted within a groove 114 formed in the shaft.

Gear 112 is fixed to a shaft 115 which is driven at a substantially constant speed by a small electrical motor 116 mounted upon a bracket 117 suitably secured to the housing 10. Motor 116 is preferably a selsyn-type motor powered by the main A. C. generator of the aircraft and controlled by an electronic device using an oscillator to establish a definite frequency. Other suitable means such as a small D. C. motor of constant speed design powered by a rectified current from the main A. C. generator or powered by a battery may be employed to provide a constant reference speed. Motor 116 is quite small since it is only required to produce the small amount of power necessary to drive gear 107 of the governor differential assembly.

The speed of shaft 115 is adjusted such that it turns gear 107 at a speed which is proportional to the desired output speed of shaft 12, and when shaft 12 is rotating at such desired speed, gear 28 will rotate at exactly the same speed as gear 107. However, shaft 115 rotates in such a direction that gear 107 rotates in the opposite direction from gear 28. It is therefore apparent that when output gear 25 is rotating at the desired output speed, there will be no movement of the spider gear means 100 and shaft 94, and upon a relative difference in speed between gears 28 and 107, spider gear means 100 and shaft 94 will rotate.

A substantially disk-shaped member 120 has a central opening formed therethrough and is pressed on the outer end 121 of shaft 94. A bearing 122 is pressed within the opening in member 120 and journals a reduced end portion 123 of a shaft 124 which is suitably journaled in wall 11 and held in place by a snap ring 124' formed in groove 125 formed in the shaft. Disk member 120 comprises one member of a positive clutch means and has two diametrically opposite pins 126 extending laterally therefrom. A second clutch member 127 has a central opening formed therethrough having a keyway formed therein which receives a feather 128 secured to shaft 124 whereby member 127 is rotatably fixed to shaft 124 but may slide axially relative thereto. Member 127 has two diametrically opposite openings 129 formed therethrough which are adapted to receive pins 126 whereby a positive drive connection is effected between shafts 94 and 124. Clutch member 127 is formed of a metallic substance such as iron or the like, and electromagnetic coils 130 suitably mounted upon wall 11 are provided for disengaging the clutch when energized, the clutch being normally engaged by means of a compression spring 131 which is mounted about shaft 124.

A bevel gear 135 is fixed to input shaft 12 and engages a similar bevel gear 136 rotatably journaled within a bracket 137 secured to wall 11. Gear 136 is connected to and actuates a conventional centrifugal switch indicated schematically at 138. The centrifugal switch is inserted in a suitable electrical circuit and is adjusted such that coils 130 will be deenergized thereby allowing the clutch to engage at speeds of the input shaft corresponding to the range between 300 and 2700 R. P. M. of the prime mover of the aircraft when the optimum cruising speed of the prime mover is approximately 2400 R. P. M. At all speeds below 300 R. P. M. and above 2700 R. P. M. of the prime mover the clutch will be disengaged due to energization of coils 130.

The outer end of shaft 124 has a helical gear 140 secured thereto and as may be most clearly seen in Fig. 2, gear 140 is in engagement with similar helical gears 141 and 142 each of which is secured to one of the jack shafts 70, 71.

Referring now to Figs. 4–9 which illustrate the details of construction of the novel variable tooth gear 55 of the invention device, it may be seen that the components thereof are mounted upon a substantially circular rigid body means indicated generally by reference numeral 145 which comprises three separate members. The first of the three members comprising the body means is most clearly illustrated in Fig. 6 which shows an isometric cross-sectional view thereof, and the first member consists of a ring-shaped member 146 formed of steel or the like and having a plurality of circumferentially spaced openings 147 formed radially therethrough, and a groove 148 is formed circumferentially in the inner surface of the ring member. A plurality of spaced threaded openings 149 are provided in the opposite lateral surfaces of the ring member.

The other two members of the body means are complementary parts, one being the mirror image of the other, and therefore only one of which need be described in detail. One of the other two members, which may be termed tooth support members, is indicated by reference numeral 150 in Fig. 7 which discloses an isometric cross-sectional view of a portion thereof. Each of the two tooth support members is a substantially circular rigid member formed of steel or the like material. A circumferential flange 151 extends upwardly from each of members 150 and the outer lateral surface 152 thereof tapers downwardly. Flanges 151 of each support member 150 form a seat therebetween to accommodate ring member 146. A plurality of openings 153 are formed laterally through members 150, the openings have an elongated cross-sectional configuration with rounded end portions. A plurality of circumferentially spaced cut-out portions 154 are formed in member 150 and extend radially from the surface 155 thereof to the top of openings 153. Each of cutout portions 154 defines half of a cylinder, and when the two complementary tooth support members are juxtaposed to one another such that cutout portions 154 thereof are in alignment, the cutout portions provide a radially extending cylindrical opening through the assembly from surface 155 into openings 153.

Figures 4, 5:
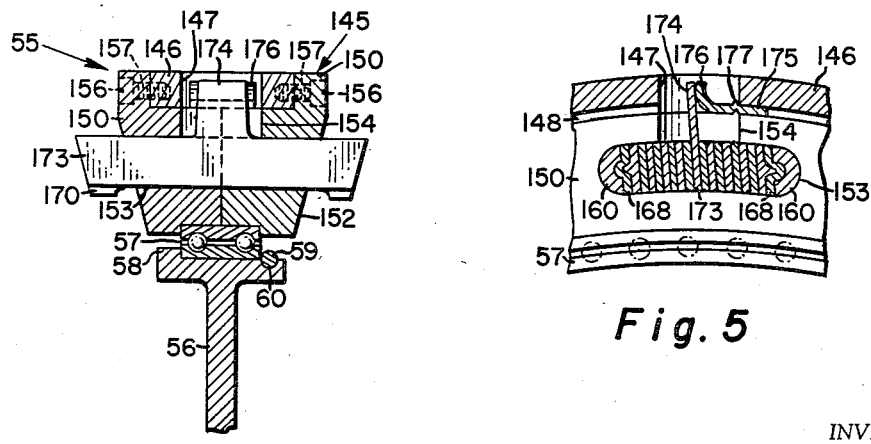
Fig. 4 is an enlarged cross-sectional view of the variable tooth gear of the device illustrating the novel construction thereof.
Fig. 5 is another sectional view of the variable tooth gear of the device taken at right angles to the view shown in Fig. 4.

Figures 4 and 5 illustrate the body means in assembled position when tooth support members 150 are juxtaposed to one another with the inner surface of ring member 146 resting on surface 155 of members 150 and openings 147 of member 146 radially aligned with the openings defined by cutout portions 154 of members 150. The three components of the body means are secured in assembled position by means of screws 156 which are threaded through correspondingly threaded openings 157 provided laterally through flange 151 of member 150 and into openings 149 provided in member 146. As may be seen in Fig. 2, openings 153 formed in the tooth support members provide a number of recesses in the rigid body assembly for mounting the variable teeth of the gear, presently to be described.

Fig. 5 shows an enlarged view of one of the variable teeth of the gear in assembled position, and Fig. 8 and 9 illustrate the various representative component slats of the teeth in disassembled position. The slats as shown in Fig. 8 and 9 include an end slat 160 having a flat lateral surface 161 and a curved lateral surface 162 which is complementary to the curved portion of openings 153. Surface 161 has a curved recess 163 formed therein equidistant from the end portions thereof. It should be noted that the opposite ends of surface 162 are tapered downwardly as viewed in Fig. 8 at edges 164 and the adjacent portion 165 thereof is cut away such that it slopes from portions 166 of surface 162 downwardly to edges 164.

Slats 168 have opposite lateral faces thereof tapered slightly with respect to each other as shown in Fig. 9 and a small rounded protuberance 169 is formed on one surface thereof, the protuberance being adapted to seat within opening 163 formed in member 160. The opposite end edges of member 168 taper downwardly and small ears 170 are formed at the bottom thereof. Slat members 171 are identical with members 168 except that there are no protuberances formed thereon, and filter slat members 172 are identical with members 171 except that an ear is formed at only one end of the slat. Central slat member 173 has no ears formed thereon, but has a central lug 174 formed integral therewith which extends upwardly from the top edge thereof. It should be noted that the opposite lateral faces of each of members 171, 172 and 174 are tapered slightly with respect to one another as seen in Fig. 9 such that the members may be on the order of .020 inch thick at the upper edge thereof and .018 inch thick at the lower edge thereof.

When members 173 are in operative position as shown in Fig. 4, lugs 174 extend upwardly through the radial openings in members 150 and 146. In assembling the slats within openings 153, slats 160 are inserted at opposite ends of the openings such that the rounded lateral surfaces thereof are in engagement with the rounded ends of the openings. Members 168 are then inserted at an angle such that ears 170 may clear the lower lip of the openings and protuberances 169 are seated within recesses 163. Members 171 are then inserted at an angle such that the ears thereof clear the lower lip of the openings until enough of the slats have been inserted such that no more additional slats 171 may be inserted at the proper angle to allow the ears of the slats to clear the lower lip of the openings. Filter slats 172 may then be inserted between the other slats until the space between end slats 160 is substantially filled as shown in Fig. 5. It is apparent that the slats are free to rock in both directions circumferentially and also to slide laterally with respect to the body means.

A spring 175 is seated within groove 148 formed in ring member 146 and has a rounded end portion 176 which engages lug 174, the spring being crimped at 177 to maintain it in position. The spring thereby biases each of the slat members into a tilted position as shown in Fig. 5. This tilted position is necessary to bring the edges of the slat members into position such that they will properly engage the teeth formed on the cone members. It is apparent that the slats must be tilted at an angle with respect to the radius of the variable tooth gear since the radius of the cone members and the teeth formed thereon are at a different angle than the radius of the variable tooth gear. Springs 175 bias the slats into a position such that the end edges of each of the slats is parallel to the lateral portions of the teeth of the cone members at the time of contact between the slats and the cone members thereby ensuring proper engagement therebetween. Since the slats may freely slide laterally as limited by ears 170, the slats are adapted to assume the proper configuration upon engagement with the cone members such that a positive drive is effected between the slats and the radial teeth of the cone members regardless of the position of the variable tooth gear and the associated teeth thereof along the radius of the cone members.

The operation of the device is as follows:

It is assumed that at engine speeds below 300 R. P. M. it is not necessary to drive the generator at a constant output since this is only an idling speed and would have to be considerably increased before the aircraft becomes airborne. Below 300 R. P. M. support member 56 is initially positioned such that the lower pair of cones 43, 44 are at their minimum distance from one another and gear 55 engages cones 43, 44 at the maximum distance radially outwardly thereof and engages cones 50 and 51 at the minimum distance radially outward thereof. When the input shaft is rotating at a speed less than 300 R. P. M., centrifugal switch 138 maintains coils 130 energized and the clutch is thereby disengaged. As a result, the variable ratio transmission means is inoperative and the device will not function to give a constant output speed. Upon reaching 300 R. P. M., switch 138 deenergizes coils 130 and the clutch is engaged by spring 131, thereby causing the device to become operative for the purpose disclosed. Motor 116 drives gear 107 at a speed proportional to the desired output speed. If gear 25 is rotating at the desired output speed, gear 28 will rotate at the same speed as gear 107 but in the opposite direction and there will be no movement of shaft 94. However, as soon as the speed of the output gear 25 differs from the desired output speed, there will be a difference in speed of gears 28 and 107 thereby causing movement of the spider gear means 100 and shaft 94 in a direction in accordance with the relative difference in speed.

Rotation of shaft 94 is transmitted through the clutch to shaft 124 and gear 140 which in turn drives gears 141 and 142 and jack shafts 70, 71 which are so threaded that they turn in the same direction and thereby produce an upward movement of support member 56 and the associated variable tooth gear 55. As the support member 56 moves upwardly, it is apparent that it is also displaced longitudinally with respect to shafts 12 and 48 such that the teeth thereof travel along the teeth of fixed cones 43 and 51.

Upon upward movement of support member 56, arms 86, 87 and the associated rollers 90 cooperate with levers 82 and the cam grooves 85 formed therein such that cone 50 is urged toward cone 51 and cone 44 is allowed to move away from cone 43. In this manner, the cones are maintained in engagement with gear 55 at all times. As the gear ratio changes between the two pairs of cones, the speed of control gear 35 is also altered, and it should be noted that gear 35 thereby rotates at all times at the desired output speed and in the proper direction. However, it is desirable to transmit as little power through the variable ratio transmission as possible, and accordingly a power differential means is provided whereby most of the power is transmitted through spider gear means 21 and 22 and intermediate gear 30 to the output gear 25, gear 35 merely serving to control the speed of the output gear.

Shaft 94 continues to rotate and actuate the jack shafts which thereby continue to change the gear ratio between the two pairs of cones until gears 35 and 25 are rotating at the desired output speed. When gear 25 and gear 28 are rotating at the proper speed, there will be no movement of spider gear means 100, thereby halting the movement of support member 56 and gear 55 by the jack shafts. Upon any variation in the desired output speed, spider gear means 100 will instantly start to rotate thereby driving the jack shafts in a proper direction to compensate for the differences in speed between the output speed gear and the reference speed gear 107 of the governor differential such that the gear ratio between the two pairs of cones is changed causing a consequent alteration in the output speed of gears 35 and 25.

Regardless of whether the output speed is higher or lower than desired, the governor differential will cause the jack shafts to rotate in the proper direction to produce the desired correction. When the speed of the input shaft exceeds 2700 R. P. M. thereby causing switch 138 to disengage the clutch and prevent further actuation of the jack shaft, support member 56 will have moved upwardly such that cones 50 and 51 are at their minimum distance apart and cones 43 and 44 are at their maximum distance apart and gear 55 is at its radially outward limit of movement with respect to cones 50, 51 and at its radially inward limit of movement with respect to cones 43, 44.

It is evident that if it were desired, the output could be taken directly from gear 35, but it is considered preferable to merely control a power differential with gear 35 whereby the components of the variable ratio transmission including the cone members and the variable tooth gear are not required to transmit a great deal of load thereby enabling them to be made smaller and diminishing the likelihood of failure thereof. It is apparent that the power differential is of simple construction and may be very sturdily constructed.

Although the centrifugal switch 138 prevents the jack shafts from being actuated to move support member 56 beyond certain limits, it may also be desirable to provide conventional limit switch means which may be connected to and actuated by the jack shafts to disengage the clutch should the centrifugal switch 138 become inoperative. Such limit switch means would serve as an additional safety feature to prevent damage to the device.

It is apparent from the foregoing that there is provided a new and novel automatic constant speed device which gives a substantially constant output speed over a wide range of varying input speeds and which eliminates the necessity of providing heavy D. C. equipment and accompanying inverter devices in aircraft. The device is comparatively light, compact and inexpensive in construction, yet rigid and efficient in operation.

Obviously many modifications and variations of the present invention are possible in the light of the above teachings. It is therefore to be understood that within the scope of the appended claims the invention may be practiced otherwise than as specifically described.

I claim:

1. An automatic constant speed device which comprises power input means, power differential means connected to said power input means, variable ratio transmission means having drive means and driven means, said drive means being connected to said power input means, variable tooth gear means connecting said drive means to said driven means, said variable tooth gear comprising a substantially circular rigid body means, a plurality of gear tooth slats slidably disposed in said body means, means on certain of said slats for limiting sliding movement thereof, resilient means supported by said body means and engaging certain of said slats for biasing all of said slats in a tilted position such that each lateral face of said slat members is disposed at an acute angle with respect to a radius of said body means passing through said face, said driven means being connected to said power differential means, power output means connected to said power differential means, governor differential means connected to a source of power producing a substantially constant speed, the output of said governor differential means being connected to said variable ratio tranmission means for controlling the ratio thereof.

2. A device as defined in claim 1 including means for disconnecting said governor differential means from said portion of said variable ratio transmission means.

3. An automatic constant speed device which comprises a power input shaft, power differential means including at least one gear means rotatably fixed to said shaft, variable ratio transmission means having drive means and driven means, said drive means being rotatably fixed to said shaft, variable tooth gear means in engagement with said drive means and driven means, said variable tooth gear comprising a substantially circular rigid body means, a plurality of gear tooth slats slidably disposed in said body means, means on certain of said slats for limiting sliding movement thereof, resilient means supported by said body means and engaging certain of said slats for biasing all of said slats in a tilted position such that each lateral face of said slat members is disposed at an acute angle with respect to a radius of said body means passing through said face, actuating means connected to said variable tooth gear means for altering the position thereof relative to said drive means and said driven means, said driven means being connected to a portion of said power differential means, power output means connected to said power differential means, governor differential means having a member connected to a source of power producing a substantially constant speed, and means connecting the output of said governor differential means to said actuating means for controlling the ratio of said variable ratio transmission means.

4. An automatic constant speed device which comprises a power input shaft, power differential means including spider gear means rotatably fixed to said shaft, control gear means mounted for rotation with respect to said shaft and being in engagement with said spider gear means, a plurality of toothed cone members rotatably fixed to said input shaft, a second shaft disposed in parallel spaced relationship with respect to said input shaft, a plurality of toothed cone members rotatably fixed to said second shaft, a variable tooth gear in engagement with the cones on each of said shafts, said variable tooth gear comprising a substantially circular rigid body means, a plurality of gear tooth slats slidably disposed in said body means, means on certain of said slats for limiting sliding movement thereof, resilient means supported by said body means and engaging certain of said slats for biasing all of said slats in a tilted position such that each lateral face of said slat members is disposed at an acute angle with respect to a radius of said body means passing through said face, actuating means connected to said variable tooth gear means for altering the position thereof relative to said cone members, said second shaft being connected to said control gear means, power output means connected to a portion of said power differential means, governor differential means including a reference speed gear, means for rotating said reference speed gear at a substantially constant speed, and means connecting the output of said governor differential means to said actuating means for controlling the speed of said control gear means.

5. A device as defined in claim 4 wherein said variable tooth gear is rotatably mounted on a support member, a threaded fitting pivotally mounted on said support member, said actuating means including jack shaft means threadedly engaging said fitting.

6. A device as defined in claim 5 including clutch means for disconnecting said governor differential means from said actuating means and speed responsive means connected to said input shaft for controlling the operation of said clutch means.

7. An automatic constant speed device which comprises a power input shaft, power differential means connected to said power input shaft, a first pair of toothed cone members rotatably fixed to said input shaft, one of said first pair of members being axially slidable relative to said shaft, a second shaft disposed in parallel spaced relationship with respect to said input shaft, a second pair of toothed cone members rotatably fixed to said second shaft, one of said second pair of members being axially slidable relative to said second shaft, variable tooth gear means in engagement with the cones on each of said shafts, said variable tooth gear means being rotatably mounted upon a substantially circular rigid support member, a plurality of gear tooth slats slidably disposed in said support member, means on certain of said slats for limiting sliding movement thereof, resilient means supported by said support member and engaging certain of said slats for biasing all of said slats in a tilted position such that each lateral face of said slat members is disposed at an acute angle with respect to a radius of said body means passing through said face, actuating means including jack shaft means threadedly connected to said support member for moving said variable tooth gear means relative to said cone members, said second shaft being connected to a portion of said power differential means, power output means connected to a portion of said power differential means, governor differential means including a reference speed gear and an output speed gear, means for rotating said reference speed gear at a substantially constant speed, said output gear being connected to said power output means, and means connecting the output of said governor differential means to said jack shaft means.

8. A device as defined in claim 7 including a plurality of control arms connected at one end thereof to said support member, a plurality of lever members each of which is pivotally mounted on a fixed member at one end thereof and operatively connected to one of said slidable cone members at the opposite end thereof, cam means on said lever members, and cam means on the opposite ends of said control arms in engagement with the cam means on said lever members for actuating said lever members and said slidable cone members upon lateral movement of said support member.

9. A device as defined in claim 8 wherein the cam means on said lever members comprises slots formed therein and the cam means on said control arms comprises roller members rotatably mounted thereon and disposed within said slots, the operative connection between said lever members and said slidable cone members including a thrust bearing in engagement with said cone members and a yoke member connecting said thrust bearings to said opposite ends of said lever members.

10. An automatic constant speed device which comprises a power input shaft, power differential means including a plurality of spider gear means rotatably fixed to said shaft, output gear means and control gear means rotatably journaled on said shaft, said output gear means being in engagement with one of said spider gear means and said control gear means being in engagement with another of said spider gear means, a first pair of cone members having radial teeth formed thereon and being rotatably fixed to said input shaft, one of said first pair of cone members being axially fixed to said input shaft and the other of said first pair of cone members being axially slidable with respect to said input shaft, a second shaft disposed in parallel spaced relationship with respect to said input shaft, a second pair of cone members having radial teeth formed thereon and being rotatably fixed to said second shaft, one of said second pair of cone members being axially fixed to said second shaft and the other of said second pair of cone members being axially slidable with respect to said second shaft, said second shaft being geared to said control gear means, variable tooth gear means drivingly connecting said two pairs of cone members, said variable tooth gear means being rotatably supported on a substantially circular rigid support member, said variable tooth gear comprising a substantially circular rigid body means, a plurality of gear tooth slats slidably disposed in said body means, means on certain of said slats for limiting sliding movement thereof, resilient means supported by said body means and engaging certain of said slats for biasing all of said slats in a tilted position such that each lateral face of said slat members is disposed at an acute angle with respect to a radius of said body means passing through said face, a plurality of control arms fixed at one end thereof to said support member, a plurality of lever members pivotally connected at one end thereof to a fixed member, the opposite ends of said control arms being connected to an intermediate portion of said lever members, the opposite ends of said lever members being operatively connected to said slidable cone members, a plurality of openings formed in said support member through which said shafts are freely movable, a plurality of jack shafts threadedly connected to said support member, governor differential means including a reference speed gear and an output speed gear, means for rotating said reference speed gear at a substantially constant speed, said output speed gear being connected to said output gear means, differential output gear means in engagement with said reference speed gear and said output speed gear, said differential output gear means being connected to said jack shafts, and clutch means for disconnecting said differential output gear means from said jack shafts.

11. A device as defined in claim 10 wherein said reference speed gear and said output speed gear are so geared as to rotate in opposite directions.

12. A device as defined in claim 11 wherein said clutch means is normally engaged, and speed responsive means connected to said input shaft for disengaging said clutch means.

13. A variable tooth gear which comprises a substantially circular rigid body means, a plurality of gear tooth slats slidably disposed in said body means, means on certain of said slats for limiting sliding movement thereof, and resilient means supported by said body means and engaging certain of said slats for biasing all of said slats into a tilted position such that each lateral face of said slat members is disposed at an acute angle with respect to a radius of said body means passing through said face.

14. A variable tooth gear which comprises a substantially circular rigid body means having a plurality of circumferentially spaced openings formed laterally therethrough, a plurality of gear tooth slats slidably disposed within said openings, means on certain of said slats for limiting sliding movement thereof, generally radially extending lug means formed on certain of said slats, and spring means supported by said body means and engaging each of said lug means for biasing all of said slats into a tilted position such that each lateral face of said slat members is disposed at an acute angle with respect to a radius of said body means passing through said face.

15. A variable tooth gear which comprises a rigid substantially ring-shaped member, a substantially circular rigid tooth support member disposed adjacent opposite lateral portions of said ring member and secured thereto, said tooth support members having circumferentially spaced openings formed laterally therethrough and circumferentially spaced openings formed radially therethrough and being in communication with said lateral openings, a plurality of gear tooth slats slidably disposed within said lateral openings, means on certain of said slats for limiting sliding movement thereof, generally radially extending lug means formed in certain of said slats and passing through said radial openings, and spring means supported by said body means and engaging each of said lug means for biasing all of said slats into a tilted position such that each lateral face of said slat members is disposed at an acute angle with respect to a radius of said ring member and said tooth support members.

16. A device as defined in claim 15 wherein said ring member has radial openings formed therein in radial alignment with said radial openings in said tooth support members, and has a circumferential groove formed on the inner surface thereof, said lug means being disposed within said radial openings in said ring member and said spring means being disposed within said groove.

17. A device as defined in claim 16 wherein each of said tooth support members has a first radial flange in engagement with a lateral face of said ring member and a second radial flange adapted to clamp a ball bearing race in position.

References Cited in the file of this patent

UNITED STATES PATENTS

| | | |
|---|---|---|
| 1,601,662 | Abbott | Sept. 28, 1926 |
| 2,429,570 | Trofimov | Oct. 21, 1947 |
| 2,578,403 | Danelon | Dec. 11, 1951 |
| 2,686,432 | Bergmann | Aug. 17, 1954 |
| 2,714,825 | Ferrari | Aug. 9, 1955 |